March 13, 1951  D. B. GARDINER ET AL  2,545,077
POWER TRANSMISSION
Original Filed Dec. 21, 1945  4 Sheets-Sheet 1
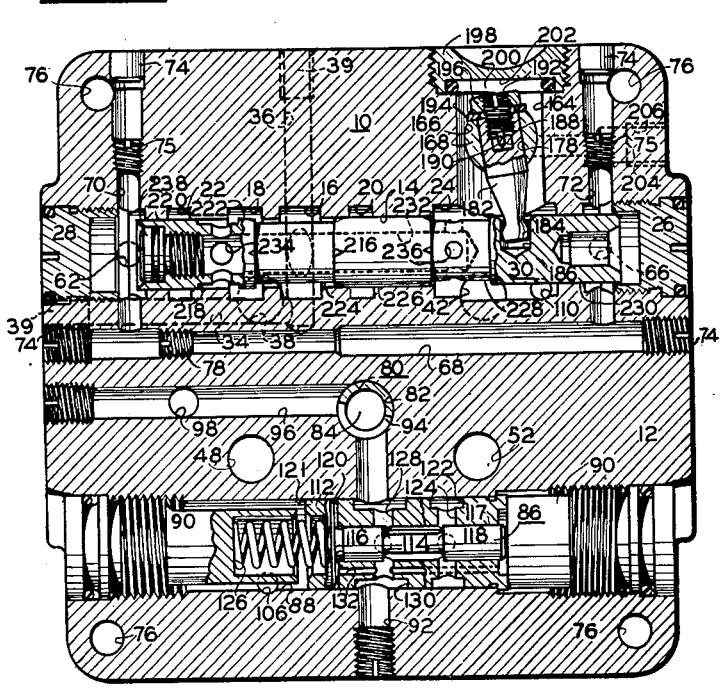
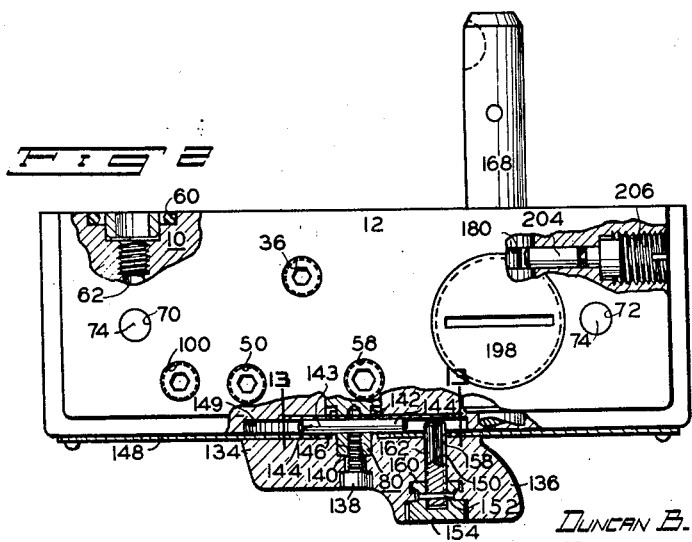
INVENTORS
DUNCAN B. GARDINER AND
BERNARD L. READMAN
By Ralph L. Tweedale
ATTORNEY

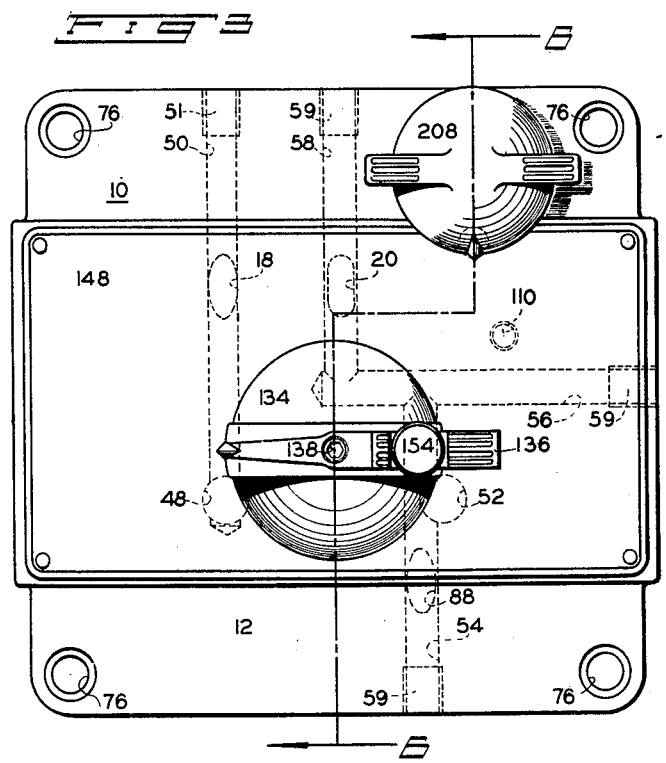
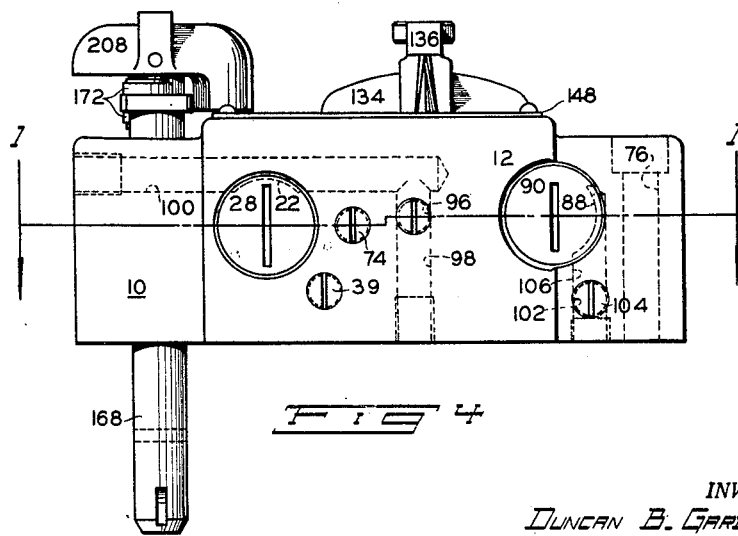

March 13, 1951 D. B. GARDINER ET AL 2,545,077
POWER TRANSMISSION
Original Filed Dec. 21, 1945 4 Sheets-Sheet 3
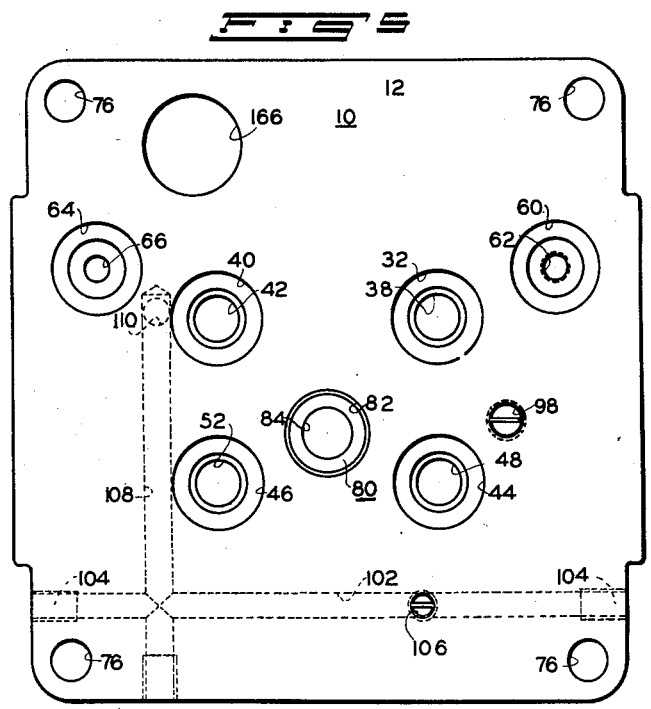
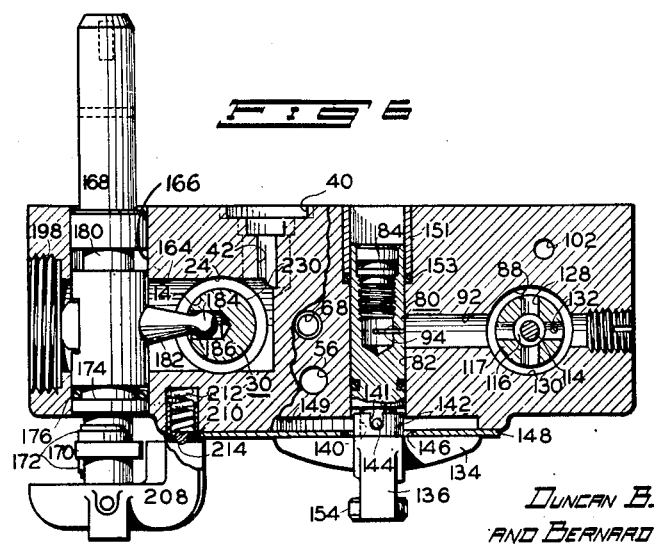
INVENTORS
DUNCAN B. GARDINER
AND BERNARD L. READMAN
By Ralph L. Tweedale
ATTORNEY

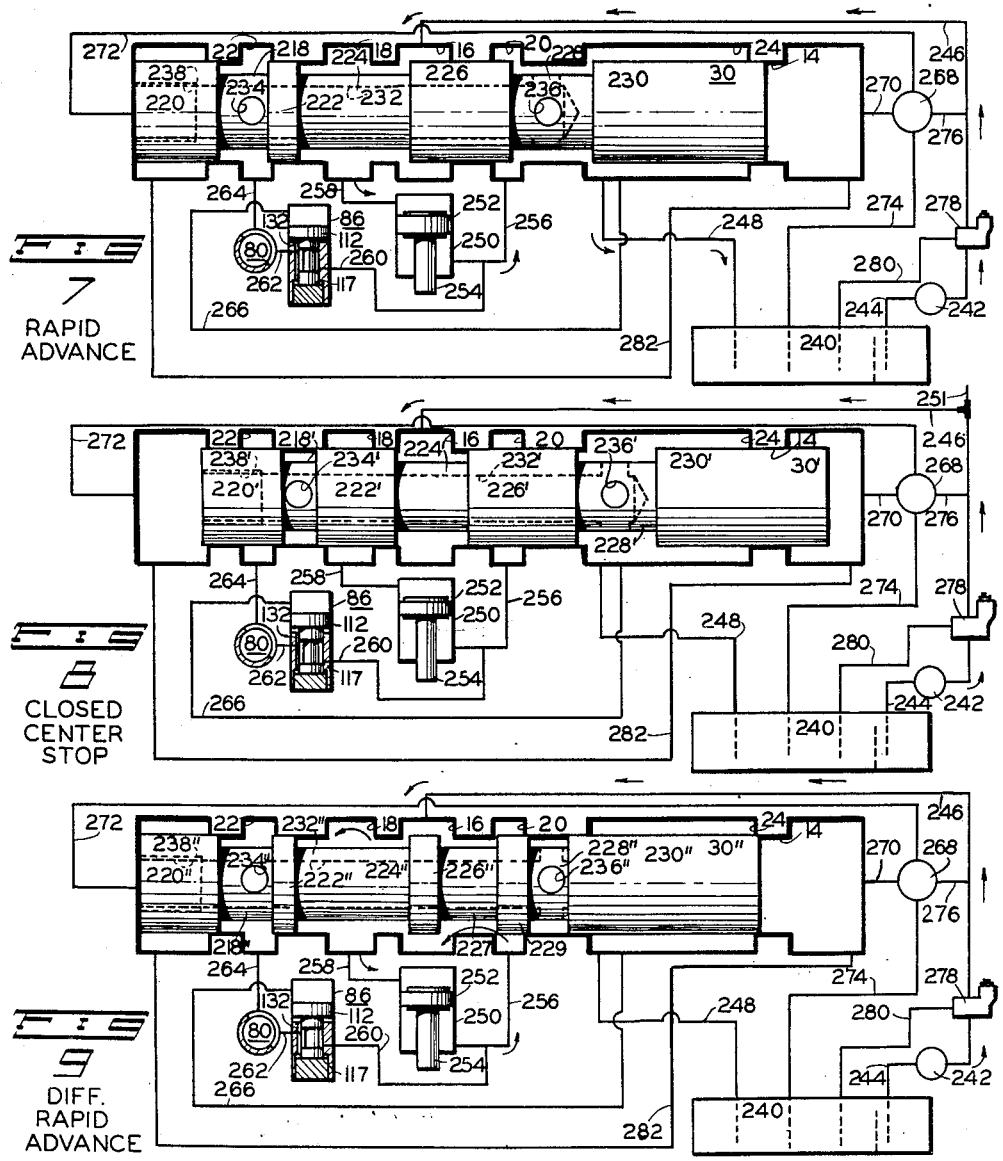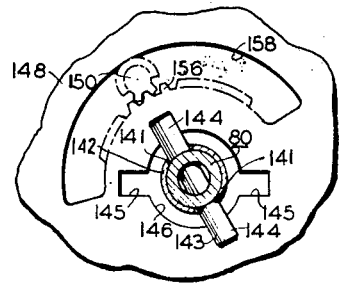

Patented Mar. 13, 1951

2,545,077

UNITED STATES PATENT OFFICE 2,545,077

POWER TRANSMISSION

Duncan B. Gardiner, Detroit, and Bernard L. Readman, Pontiac, Mich., assignors to Vickers Incorporated, Detroit, Mich., a corporation of Michigan Original application December 21, 1945, Serial No. 636,324. Divided and this application May 12, 1949, Serial No. 92,932

3 Claims. (Cl. 74—10.52)

This invention relates to power transmissions, and is particularly applicable to those of the type comprising two or more fluid pressure energy translating devices, one of which may function as a pump and another as a fluid motor.

The present application is a division of applicants' copending application Serial No. 636,324, filed December 21, 1945, now Patent No. 2,491,371.

The invention more particularly relates to hydraulic transmission systems for driving machine tools incorporating a fluid pump, reversible fluid motor and a control panel containing the necessary valving for producing rapid advance, feed, and rapid return movements of the motor and also for stopping the same.

In the art of hydraulic transmission systems of this type, the use of a panel incorporating the necessary valving to control the movement of the motor has become quite common. However, it has been the practice to use entirely different panels containing entirely different porting, passages, and valving to meet the requirements of various types of installations. Thus, a panel incorporating an open-center type control valve, although suitable for some installations, would be entirely inadequate for systems demanding the use of a closed-center type of control valve or the use of a differential type control valve. For instance, whereas a panel incorporating an open-center type control valve would be adaptable for use in a hydraulic transmission containing a constant delivery pump and reversible fluid motor for driving a single load device, if another fluid motor was added to the transmission to drive an additional load device during periods of inactivity of the first load device, an entirely different panel incorporating a closed-center control valve would have to be substituted for the first panel.

It is therefore an object of this invention to provide a panel which may be used to fit a variety of installation requirements simply by substituting a control valve of one type for a control valve of another type all of which are mountable within the same valve bore of the panel without any other changes being made to the panel.

In particular, it is an object of this invention to provide a panel for use in a hydraulic transmission containing a fluid pump and reversible fluid motor in which may be shiftably mounted any one of three different type control valves for producing rapid advance, feed, and rapid reverse movements of the motor and for stopping the same.

It is a further object of this invention to provide a panel for a transmission as above stated which contains porting, passages, and a valve bore designed in such a manner that three differently designed control valves may be shifted in identically the same manner within said bore for controlling the ports and passages to produce the aforementioned movements of the motor, one control valve being of the open-center type for unloading the pump to stop the motor, another being of the closed-center type for blocking the flow of pressure fluid at the control valve to stop the motor and the other being of the differential type to produce a differential rapid advance movement of the motor.

It is another object of this invention to provide a control panel for a hydraulic transmission system and for the purposes such as stated above which will be light in weight, compact and which will give long life and be easily convertible to suit the needs of different installations.

It is still another object to provide a panel for a system and for the purposes as above stated containing a longitudinal bore in which may be identically mounted any one of three control valves of different types shiftable completely within said bore, with identical means for shifting said control valves manually or mechanically from the front or the rear of said panel by pressure fluid applied at either end of said control valve, by solenoid means, or by a combination of any of the above means.

It is still another object of this invention to provide for a panel having a valve member rotatably mounted therein, such as a throttle, an improved dial and knob assembly adapted to provide coarse and fine manual operation of the valve member.

Further objects and advantages of the present invention will be apparent from the following description, reference being had to the accompanying drawings wherein a preferred form of the present invention is clearly shown.

In the drawings:

Figure 1 is a cross-sectional view of a panel embodying one form of the present invention taken on line 1—1 of Figure 4.

Figure 2 is a plan view of the panel.

Figure 3 is a front elevation of the panel.

Figure 4 is a bottom view of the panel.

Figure 5 is a rear elevation of the panel.

Figure 6 is a cross sectional view taken on line 6—6 of Figure 3.

Figure 7 is a diagrammatic view of a hydraulic circuit incorporating the panel of Figures 1 through 6 and showing a portion thereof in one of its different positions.

Figure 8 is a diagrammatic view of a hydraulic circuit incorporating another form of panel and showing a portion thereof in one of its positions.

Figure 9 is a view of a hydraulic circuit incorporating still another form of panel and showing a portion thereof in one of its positions.

Figure 10 is a sectional view taken along line 13—13 of Figure 2.

Referring now to Figure 1, there is shown a cross-sectional view of a unitary control panel 10 comprised of a block 12 having a longitudinal main valve bore 14 extending completely across said block. Bore 14 is provided with a groove forming a pressure port 16 located between two grooves forming motor ports 18 and 20. Spaced apart from port 18 is a groove forming a throttle port 22 and spaced apart from port 20 is a groove of much greater length forming a tank port 24. There is also shown shiftably mounted within bore 14, which is suitably closed at each end thereof by plugs 26 and 28, a control valve 30 of the open-center type for the purpose of controlling and directing the flow to and from the aforementioned ports. Pressure fluid is admitted and emitted to and from the panel 10 by means of external connection ports at the rear of said panel shown in Figure 5.

Referring now to Figures 1 and 5, there is shown an external pressure port 32 which is connected to the internal pressure port 16 by means of a lateral passage 34 extending from the left side of block 12 to a point of intersection with a vertical passage 36 constructed from the top of block 12 and which intersects pressure port 16 and a passage 38 directly connected to external pressure port 32 and extending to passage 34. The exterior terminus of passages 34 and 36 are suitably closed by plugs 39. Thus, pressure fluid entering external pressure port 32 is conducted to internal pressure port 16 by means of passage 38, lateral passage 34, and vertical passage 36. An external tank port 40 at the rear of panel 10 is connected directly to internal tank port 24 by means of a passage 42. Also at the rear of panel 10 is a pair of external motor ports 44 and 46. As shown in Figure 3, motor port 44 is connected to internal motor port 18 by means of a passage 48 connected directly to external port 44 which intersects a vertical passage 50 extending from the top of block 12 to a point of intersection with passage 48 and which also intersects port 18. The exterior terminus of passage 50 is closed by a suitable plug 51. Thus, fluid entering external motor port 44 is conducted to internal motor port 18 by means of passages 48 and 50.

Motor port 46 is connected to internal motor port 20 by means of a passage 52 connected directly to port 46 which intersects a vertical passage 54 extending from the bottom of block 12 to a point of intersection with a lateral passage 56. Passage 56 extends from the right side of block 12 to a point of intersection with a vertical passage 58 constructed from the top of block 12 and which intersects port 20. Passages 54, 56, and 58 are closed exteriorly by plugs 59. Thus, fluid entering external motor port 46 is conducted to motor port 20 by means of passage 52, passage 54, passage 56, and passage 58.

There is shown in Figure 5 an external pilot valve port 60 which is directly connected to the left end of bore 14 by means of a passage 62 and a similar external pilot valve port 64 which is directly connected to the right end of bore 14 by means of a passage 66. There is shown in Figure 1 a longitudinal stepped passage 68 constructed completely across block 12. A vertical passage 70 and a vertical passage 72, both of which are constructed from the top of block 12, intersect both bore 14 and passage 68 at the left and right ends of said bore and passage respectively. The exterior terminus of passages 68, 70, and 72 are closed by suitable plugs 74 and, in addition, plugs 75 are inserted in passages 70 and 72 to prevent fluid in these passages from escaping through mounting holes 76 which register with said passages. These passages permit the application of pressure fluid to either end of the control valve for hydraulic actuation thereof and permit the control valve to shift freely within its bore by providing an outlet for discharging fluid from opposite ends of the bore when the valve is shifted.

If control valve 30 is to be hydraulically operated and pilot valve controlled, a plug 78 is inserted in passage 68 between passages 70 and 72. If control valve 30 is to be operated other than hydraulically, plug 78 is removed, a suitable plug is inserted in port 62, and port 64 is left unplugged to act as a drain port for proper shifting of valve 30.

Means are provided for regulating fluid flow by mounting an adjustable throttle 80 (Figure 6) in a stepped bore 82 extending completely through block 12 from front to rear, said bore being closed at the rear by a suitable plug 84 threaded into throttle 80. In order to maintain a constantly uniform flow of fluid through throttle 80, a pressure-responsive compensating valve 86 (Figure 1) for maintaining a constant pressure drop across throttle 80 is mounted in a longitudinal bore 88 extending completely across block 12, bore 88 being closed at both ends thereof by suitable plugs 90.

In order to connect compensating valve 86 and throttle 80 in series between external motor port 44 and throttle port 22, a vertical passage 92 is constructed from the bottom of block 12 which intersects and continues through compensating valve bore 88 to bore 82 (Figure 1). Throttle 80 is so mounted in bore 82 that a throttling portion 94 thereof (Figure 6) is in alignment with passage 92 and with a passage 96 constructed from the left side of block 12 and also connected to throttle bore 82. A passage 98 constructed from the back of block 12 intersects passage 96 and continues to a point of intersection with a passage 100 (Figure 4) which is constructed from the top of block 12 to a point of intersection with passage 98 and which also intersects port 22. It should be noted at this point that passage 54 which is constructed from the bottom of block 12 and which extends to a point of intersection with passage 56 also intersects compensating valve bore 88 (Figure 3). Thus, if fluid entering external motor port 46 is blocked by control valve 30 at port 20, it may flow through port 46 to passage 52, from passage 52 to passage 54 and compensating valve bore 88 and from said bore to passage 92 (Figure 1) whence it is conducted through throttle 80 and thence by means of passages 96, 98, and 100 to port 22. In order to make compensating valve 86 truly responsive to the pressure drop across throttle 80, compensating valve 86 is also connected to the tank port 24 of bore 14. Referring now to Figure 5, this is accomplished by means of a passage 102 constructed completely across block 12 and closed at both ends by suitable plugs 104, a passage 106 constructed from the back of block 12 to compensating valve bore 88 and intersecting passage 102, and a vertical passage 108 constructed from the bottom of block 12 extending to a point of intersection with a passage 110. Passage 110 is constructed from the front of block 12 to a point of intersection with passage 108 and also intersects valve bore 14 at port 24 (Figure 1).

Referring now to Figure 1, compensating valve 86 is comprised mainly of a piston 112 connected to which is a stem 114 having lands 116 and 118. Stem 114 is shiftable within a sleeve 117 having ports adapted to cooperate with the passages connected to the compensating valve bore 88. Piston 112 is shiftable within bore 88 and is responsive to pressure in chambers 120 and 121 to the right and left, respectively, of piston 112 in bore 88. Sleeve 117 contains a groove 122 which is intersected by passage 54 and a passage 124 connected to said groove. Passage 124 is controlled in such a manner by land 118, originally biased to open position by a spring 126, that the flow of fluid therefrom through another passage 128 connected to a groove 130 which is intersected by passage 92 will be maintained uniformly constant. Land 118 will partially open and close passage 124 to admit more or less fluid through passage 128 and groove 130 to passage 92 as determined by the differential pressure existing in chambers 120 and 121 and acting on opposite sides of piston 112. Pressure fluid is admitted to chamber 120 to act against piston 112 and is also able to act against the bottom area of land 118 by means of a drilled passage 132 which is in communication with passage 128.

In order to maintain a pressure equal to the pressure past throttle 80 in chamber 121, tank port 24 is connected as aforementioned to said chamber by means of passages 106, 102, 108, and 110, passage 106 intersecting bore 108 at a point to the left of piston 112.

Referring now to Figures 2, 6, and 10, throttle 80 is connected to a dial 134 having a raised portion 136 by means of a bolt 138 threaded into throttle 80, the connected end of said throttle fitting into a bore 140 of an extended portion 142 of said dial. The extended portion of the dial 134 is also provided with slots 141. A pin 143 driven through throttle 80 has end portions 144 inserted into the slots 141 and which extend therefrom. The extreme ends 144 of the pin 143, which extend from the slots 141, are insertable through slots 145 of a hole 146 in a cover plate 148. The bolt 138 prevents the dial 134 lifting from the throttle 80 while the pin 143, in cooperation with the slots 141, provides a rotary driving connection between the dial 134 and the throttle 80. When inserting the throttle into bore 82 through the hole 146 of cover plate 148, the portions 144 of pin 143, extending from the slots 141, are inserted through the slots 145 with the extended portions finally abutting a shoulder 149 of bore 82. By rotating the dial, which covers the hole 146 of cover plate 148, the complete throttle and dial assembly is held securely in place but is freely rotatable by reason of the extended portions 144 of pin 143 being located between cover plate 146 and shoulder 149 of bore 82. A sleeve 151 having a seal 153 is press-fitted into the rear end of bore 82 and the plug 84 is threaded into throttle 80 so as to completely close and seal said bore (Figure 6).

Referring to Figures 2 and 10, means are also provided for adjusting the throttle portion 94 within bore 82 between passages 92 and 96 to very close tolerances of fluid flow by connecting a splined shaft 150 by means of a pin 152 to a small knob 154. The extreme end of the splined shaft 150 revolves about a gear rack 156 formed in an arcuate slot 158 located in cover plate 148 (Figure 10). Knob 154 is slipped from the side into slots 160 (Figure 2) running completely across raised portion 136 of dial 134 which prevents vertical movement of knob 154, and the splined shaft 150 which is mounted in a bore 162 of raised portion 136 prevents horizontal movement thereof. The diameter of the knob 154 is preferably slightly larger than the width of raised portion 136 for easy operation of the knob. It should be noted that the dial 134 may be rotated to give a coarse adjustment of the throttle or the knob 154 may be rotated to give a fine adjustment of said throttle.

For the purpose of shifting control valve 30 other than hydraulically under the control of an external pilot valve connected to the pilot valve connections 60 and 64, means are provided for shifting the valve at the front or rear of the panel 10 by having dogs attached to the motor or a machine tool contact a cam connected to a rotatable shaft which is lever-connected to the valve 30. As shown in Figure 1, a stepped bore 164 is constructed from the top of block 12 to a point of intersection with the groove forming port 24 of bore 14. Another bore 166 is constructed completely through block 12 from front to rear thereof between the top of said block and bore 14 and which intersects bore 164. A shaft 168, shown in Figure 6, having a cam 170 provided with tits 172, a recess 174 for a suitable seal 176, a transverse bore 178 and a groove 180 is inserted from the front end of block 12 into bore 166 with bore 178 of said shaft registering with the vertical bore 164 of block 12.

Referring to Figures 1 and 6, a rod 182 having a flattened ball 184 at one end thereof is inserted by the medium of bore 164 into and through bore 178 of shaft 168 with ball 184 resting in a bore 186 of proportionate area located in the right end of control valve 30. The rod 182 is provided at its end opposite the ball 184 with a threaded bore 188 and slots 190 for the purpose of threading a set screw 192 into bore 188 and, because of slots 190 therein, slightly expanding rod 182 so that rod 182 is tightly connected to shaft 168. A washer 194 and lock nut 196 locks set screw 192 in place. Vertical bore 164 is closed by a suitable plug 198 having a seal 200 inserted in a recess 202 thereof which permits ample rightward and leftward shifting of rod 182.

A pin 204 (Figure 2) threaded into a bore 206 which extends from the right side of block 12 to bore 166 fits into groove 180 of shaft 168 preventing horizontal movement thereof but leaving shaft 168 free to rotate within bore 166. A dial 208 (Figure 3) connected to shaft 168 permits manual operation of control valve 30. Due to the fact that cam 170 is located on shaft 168 between dial 208 and the face of panel 10, suitable dogs connected to a reversible fluid motor or to a machine tool (not shown) may easily contact tits 172. It is also possible to connect suitable camming at the opposite end of shaft 168 which protrudes from the rear of panel 10 to produce the same results.

It should be noted that control valve 30 is completely shiftable within bore 14 of block 12 by the arrangement of having rotatable shaft 168 at right angles to control valve 30 and connecting said shaft to said valve by means of rod 182. Thus, by rotating dial 208 or by rotating cam 170, the rod 182 will shift valve 30 leftwardly or rightwardly depending upon clockwise or counterclockwise rotation of dial 208 or cam 170. Referring to Figure 6, as dial 208 is rotated a detent 210 backed by a spring 212 is forced into successive shallow recesses 214 in number equal to the plurality of positions of control valve 30.

In Figure 1, there is shown a control valve 30 of the open-center type shiftably mounted within bore 14. Control valve 30 is comprised of a spool 216 having a groove 218 located between an end land 220 and a land 222, a groove 224 located between land 222 and a larger land 226, and a groove 228 located between land 226 and a land 230 of larger proportions than land 226. A longitudinal bore 232 extends from the left end of spool 216 to a point between lands 226 and 230. Longitudinal bore 232 is in communication with a plurality of transverse ports 234 located between lands 220 and 222 and also in communication with a plurality of transverse ports 236 located between lands 226 and 230. Bore 232 is closed at its open end by a suitable plug 238.

In order to show more clearly the manner in which spool 216 controls and directs the pressure fluid to and from the spaced ports along bore 14, control valve 30 is shown incorporated in a schematic circuit in Figure 7 and shifted to the rapid advance position. There is shown in Figure 7 a tank 240 connected to a fluid pump 242 by a conduit 244. The pump 242 is connected to the pressure port 16 of control valve 30 by a conduit 246. The tank port 24 of control 30 is connected to tank 240 by means of a conduit 248.

A reversible fluid motor 250 containing a shiftable piston 252 to which is connected a piston rod 254 is connected from its rod end to motor port 20 by means of a conduit 256 while the piston end thereof is connected to motor port 18 by means of a conduit 258. A branch conduit 260 connects conduit 256 to one side of the piston 112 of compensating valve 86. A conduit 262 connects compensating valve 86 and conduit 260 to throttle 80 and a conduit 264 connects throttle 80 to motor port 22. A conduit 266 connects the opposite end of piston 112 of compensating valve 86 to tank port 24. For hydraulic actuation of control valve 30, a pilot valve 268 is connected to the right end of control valve 30 by a conduit 270, to the left end thereof by a conduit 272, to tank 240 by a conduit 274 and to the pump delivery conduit 246 by a branch conduit 276. A suitable relief valve 278 is incorporated in the pump delivery conduit and is connected to tank 240 by means of an exhaust conduit 280. For proper shifting of control valve 30, the right and left ends thereof are connected to each other by a conduit 282. A plug 78 will be inserted in conduit 282 when control valve 30 is pilot valve operated.

Referring now to Figure 7, in operation and with control valve 30 shifted completely to the left to a rapid advance position, pressure fluid will be directed from pump 242 by means of delivery conduit 246 to the pressure port 16 of control valve 30. Land 226 will block motor port 20 from port 16 and fluid is directed by means of lands 222 and 226 through the medium of groove 224 to port 18 and from such port to the head end of motor 250 by means of conduit 258 to shift piston 252. Discharging fluid from the rod end of motor 250 is conducted by means of conduit 256 to port 20 at which point lands 226 and 230 will, through the medium of groove 228, direct the fluid to tank port 24 from where it will be conducted to tank 240 by means of conduit 248. Due to the fact that the head end of motor 250 is in direct communication with the pump 242, and the rod or discharge end of said motor is in direct communication with tank 240, the total displacement of pump 242 is utilized to cause a rapid advance movement of the motor.

After piston 252 of motor 250 has been shifted a predetermined distance during rapid advance movement thereof, shaft 168 is rotated to cause spool 216 to shift to the feed forward position, not shown. In the feed forward position of valve 30 pressure fluid from pump 242 is directed by lands 222 and 226 through the medium of groove 224 to port 18 from where it is conducted to the head end of motor 250 by means of conduit 258. Discharging fluid from the rod end of motor 250 is blocked at port 20 by land 226 and must flow to tank 240 by means of conduits 260, 262, and 264 to port 22. Discharging fluid will be regulated to a predetermined flow by throttle 80 with the cooperation of compensating valve 86 in the well-known manner. Pressure fluid in excess of the total displacement of pump 242 reaching the head end of motor will be exhausted to tank 240 by means of relief valve 278 through exhaust conduit 280. The amount of regulated flow discharging from the motor through throttle 80 to port 22 will be directed to tank 240 by means of lands 220 and 222 through the medium of groove 218 to transverse port 234, bore 232, transverse ports 236, and groove 228, from which point, lands 226 and 230 will direct the fluid through port 24 to conduit 248, the latter carrying the fluid to tank 240.

Control valve 30 being of the open-center type, if the valve is shifted to the position shown in Figure 1 pressure fluid from pump 242 is directed from port 16 directly to tank 240. Fluid is directed from port 16 to port 18 through the medium of lands 222 and 226 and groove 224 and from port 18 to groove 218, transverse port 234, bore 232, transverse port 236, groove 228, tank port 24, and conduit 248 to tank 240. It should be noted that in this position pressure port 16 is in direct communication with tank port 24 so that the complete delivery of pump 242 is unloaded to tank 240 in order to stop motor 250. Land 222 is designed to permit communication in this position between groove 218 and groove 224 through the medium of the groove forming port 18.

The ports spaced along bore 14 are so spaced apart that control valves of different form than control 30 may be shiftably mounted within said bore to produce rapid advance, feed, and rapid return movements and to stop said motor. However, where it is necessary to use a closed-center control valve because of certain installation requirements, for instance, the operation of a load device from a branch line 251 in addition to motor 250 while motor 250 is stopped, a control valve of this type may be shiftably mounted in bore 14 in exactly the same manner as control valve 30 to produce the same movements of the motor as valve 30 except that the motor 250 will be stopped by blocking flow of pressure fluid at port 16. For this purpose, there is shown in Figure 8 a closed-center type of control valve 30' of slightly different form than control valve 30, which is incorporated in a schematic circuit identical to that illustrated in Figure 7. A land 222' of much greater length than the corresponding land 222 of control valve 30 is spaced much closer to a left end land 220' than is land 222 from land 220 of control valve 30. A land 226' corresponding to land 226 of control valve 30 is of slightly greater length than land 226 and a corresponding groove 224' between lands 226' and 222' is smaller than groove 224 of control valve 30.

The control valve 30' is provided with a land 220' and 230' identical to lands 220 and 230 of control valve 30 and transverse ports 234' and 236' connected by a bore 232' of the same size and approximate location of the corresponding ports and bore of control valve 30. Control 30' is mounted and shiftable to the same positions in identically the same manner as control valve 30 except for one position thereof shown in Figure 8. In the stopped position fluid flow from pump 242 entering port 16 will be blocked from communication with all other ports spaced along bore 14 by means of lands 222' and 226'.

When a reversible fluid motor of the cylinder and unbalanced piston type is used in the transmission, it may be desirable to have a differential rapid advance movement of said motor. Accordingly, a control valve of a third type may be shiftably mounted in bore 14 in identically the same manner as control valves 30 and 30', and which is illustrated in Figure 9 as being incorporated in the same schematic circuit illustrated in Figures 7 and 8.

Referring now to Figure 9, there is shown a differential control valve 30" having a groove 218" between an end land 220" and a land 222", a groove 224" between land 222" and a center land 226", a groove 227 between land 226" and a land 229, and a groove 228" between land 229 and an end land 230". Control valve 30" is also provided with transverse port 234" between lands 220" and 222" and transverse port 236" between lands 229 and 230", said ports being in communication with each other by a longitudinal bore 232". Control valve 30" is somewhat similar to control valve 30 except for an additional center land 229 which forms an additional groove 227. Also, land 230" is longer in length than that of land 230 of control valve 30. Control valve 30" will direct and control pressure fluid from pump 242 to and from the port spaced along bore 14 in exactly the same manner as control valve 30 except for the rapid advance position when it will connect the pressure port 16 to both motor ports 18 and 20 so as to provide a differential advance movement of motor 150.

It should be noted that the identical shaft 168 is connected to all three control valves in identically the same manner and that the shifting of said control valves results from the rotation of said shaft. Shaft 168 may be rotated manually from either the front or from the rear of the panel, although it can be clearly seen that the most practical method is from the front. It can also be seen that by having dogs connected to a machine tool driven by the motor contact switches, after a certain length of travel in either direction of the piston of the motor, so as to energize or deenergize one or more solenoids connected in the well-known manner to shaft 168, that several variations of combination manual and automatic shifting of the control valves are possible.

For example, one method of shifting the control valves would be for the operator to manually shift the control valve in use to a rapid advance from the stopped position. After a certain predetermined range of travel of the machine tool, a dog connected to the machine tool would contact the cam to shift the control valve to a feed position. After a certain range of travel in the feed position, a second dog on the same plane as the first dog would contact the cam to shift the control valve to the stopped position. The operator would then manually shift the control valve to rapid reverse position and after a certain range of travel a third dog, on a different plane than the first or second dog, would contact the cam to rotate shaft 168 in the other direction so as to shift the control valve again to the stopped position.

Another method would be to have the operator manually shift the control valve from the stop position to a rapid advance position and after a certain range of movement a dog connected to the machine tool would contact the cam to shift the control valve to a feed position. At the close of the feed movement, a second dog would contact a switch to energize a solenoid to shift the control valve to rapid reverse position. At the end of the rapid reverse movement, another dog would contact the cam to shift the control valve to the stopped position.

Another method would be to use an additional solenoid which would be energized at the end of a rapid reverse movement in order to immediately shift the control valve into rapid advance without a stop being made. The complete cycle of rapid advance, feed, and rapid reverse would be continuous and automatic until the motor was stopped and started again manually by the operator.

It should be noted that a change of control valves may be made without changing any of the connections or removing the panel from its mounting support simply by removing plug 198, lock nut 196, washer 194, set screw 192, and the rod 182. The control valve may then be removed from either side of the panel by removing either of the plugs 26 or 28. It should also be noted that these elements may be removed and replaced easily for use with an alternative control valve from the front, side, and top of the panel.

It should be further noted that both coarse and fine manual adjustment of the throttle is provided by the knob and dial assembly. The dial is fastened directly to the throttle to provide a coarse adjustment thereof while operation of the knob provides a fine adjustment of the throttle because of the gear rack in the cover plate and pinion which is connected to the knob and in mesh with the gear rack.

While the form of embodiment of the invention as herein disclosed constitutes a preferred form, it is to be understood that other forms might be adopted, all coming within the scope of the claims which follow.

What is claimed is as follows:

1. A dial and knob assembly for coarse and fine manual operation of a valve member adapted to be rotatably mounted within a valve block, comprising in combination a dial having a raised portion on the face thereof, and means forming a slot extending completely across the raised portion, a knob rotatably mounted in the slot of the raised portion of the dial, a cover plate provided with an arcuate gear rack, a pinion connected to the knob for rotation thereby, means for rotatably connecting the dial to the cover plate with the pinion meshing in the gear rack, means for connecting the valve member to the dial, and means for mounting the cover plate on the valve block, whereby the dial may be rotated to provide a coarse operation of the valve member and the knob may be rotated to provide a fine operation of the valve member.

2. A dial and knob assembly for coarse and fine manual operation of a valve member adapted to be rotatably mounted within a valve block, comprising in combination a dial having a raised portion on the face thereof, an extended portion opposite thereto, and means forming a slot extending completely across the raised portion, a knob rotatably mounted in the slot of the raised portion of the dial, a cover plate provided with a bore having a diameter at least equal to the diameter of the extended portion of the dial and an arcuate gear rack spaced apart therefrom, a pinion connected to the knob for rotation thereby, means for rotatably connecting the dial to the cover plate with the extended portion of the dial extending through said bore and with the pinion meshing in the gear rack, means for connecting the valve member to the dial, and means for mounting the cover plate on the valve block, whereby the dial may be rotated to provide a coarse operation of the valve member and the knob may be rotated to provide a fine operation of the valve member.

3. A dial and knob assembly for coarse and fine manual operation of a valve member adapted to be rotatably mounted within a valve block, comprising in combination a dial having a raised portion on the face thereof, an extended portion opposite thereto, a stepped bore extending completely through the dial, and raised and extended portions thereof adapted for mounting therein one end of the valve member, a second bore extending completely through the dial and raised portion thereof, and means forming a slot in the raised portion of the dial intersecting the second bore, a knob rotatably mounted in the slot of the raised portion of the dial, a cover plate provided with a bore having a diameter at least equal to the diameter of the extended portion of the dial and an arcuate gear rack spaced apart therefrom, a pinion rotatably mounted in the second bore having a portion extending therefrom and connected to the knob for rotation thereby, means for rotatably connecting the dial to the cover plate with the extended portion of the dial extending through the bore in the cover plate and with the pinion meshing in the gear rack, means for connecting one end of the valve member adaptable for mounting in the stepped bore to the dial, and means for mounting the cover plate on the valve block, whereby the dial may be rotated to provide a coarse operation of the valve member and the knob may be rotated to provide a fine operation of the valve member.

DUNCAN B. GARDINER.
BERNARD L. READMAN.

REFERENCES CITED

The following references are of record in the file of this patent:

UNITED STATES PATENTS

| Number | Name | Date |
|---|---|---|
| 647,387 | Evans | Apr. 10, 1900 |
| 1,299,765 | Norton et al. | Apr. 8, 1919 |